United States Patent [19]

Espana et al.

[11] 3,744,363

[45] July 10, 1973

[54] HARD FACED CHAIN SAW GUIDE BAR

[75] Inventors: Salvador Espana, San Pedro, Calif.; Brunson Bert Font, Lake Havasu City, Ariz.

[73] Assignee: McCulloch Corporation, Los Angeles, Calif.

[22] Filed: Oct. 4, 1971

[21] Appl. No.: 186,438

Related U.S. Application Data

[63] Continuation of Ser. No. 852,587, Aug. 25, 1969, abandoned.

[52] U.S. Cl.................................... 83/743, 29/463
[51] Int. Cl............................................ B27b 17/02
[58] Field of Search........................ 143/32 H, 32 R; 29/463

[56] References Cited
UNITED STATES PATENTS
2,962,812 12/1960 Gommel........................ 143/32 HX Primary Examiner—Donald R. Schran
Attorney—Christie, Parker & Hale

[57] ABSTRACT

The nose of a chain saw blade is radiused along its edges. The radiused nose is then grit blasted to roughen its surface and to remove any oxides. A first layer of particulate hard facing material is applied to the radiused nose and fused to obtain a metallurgical bond between the nose and the first layer. A second layer of hard facing is then welded to the prepared first layer with an inert gas shielded arc process without marked penetration into the nose's parent material. The hard facing is then finished by grinding.

7 Claims, 10 Drawing Figures

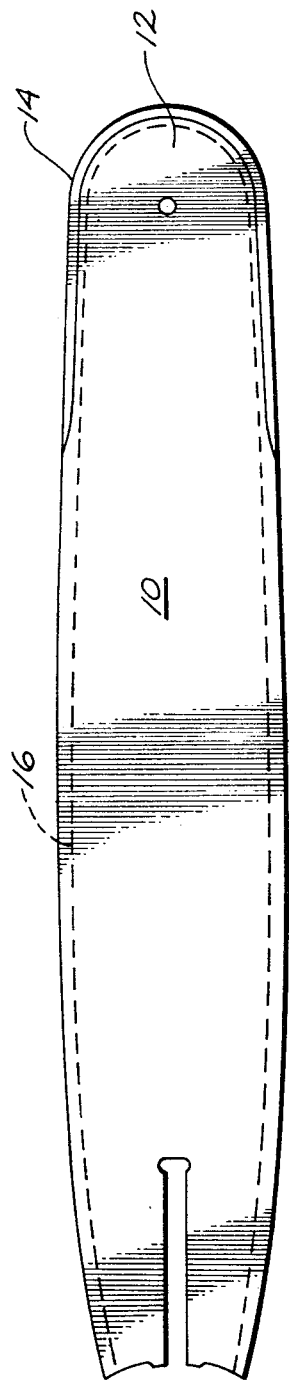
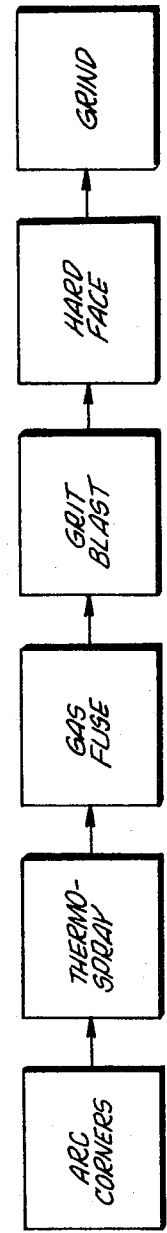
INVENTORS:
SALVADOR ESPAÑA
BRUNSON BERT FONT
BY
Christie, Parker & Hale
ATTORNEYS

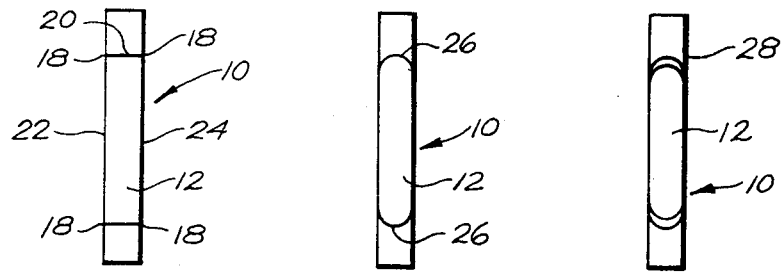
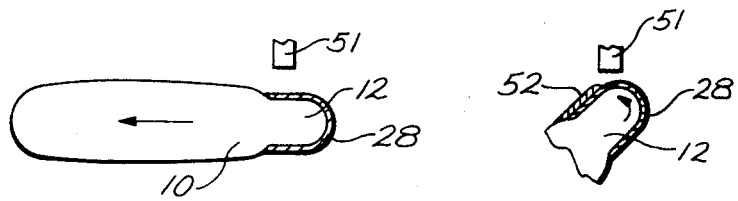
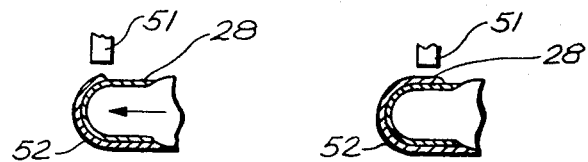
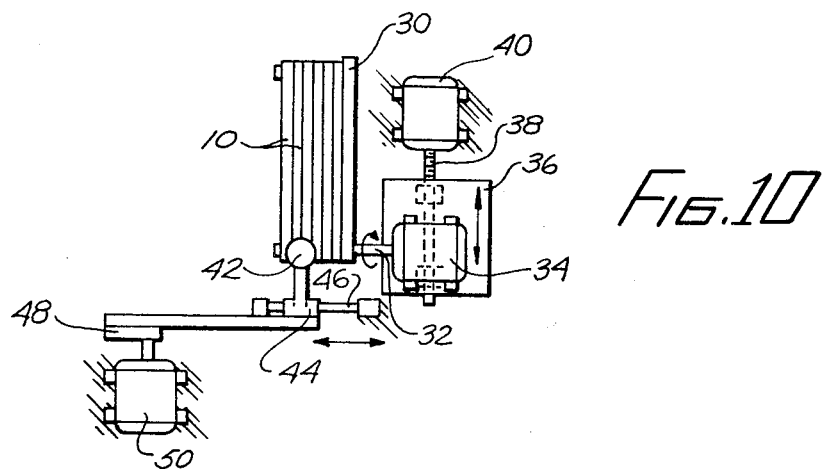

HARD FACED CHAIN SAW GUIDE BAR

CROSS REFERENCE TO RELATED APPLICATIONS

This is a continuation, of application Ser. No. 852,587 filed Aug. 25, 1969, now abandoned.

BACKGROUND OF THE INVENTION

The present invention relates to the application of hard facing onto objects such as a chain saw blade, and, more in particular, to a method of effecting a hard faced object which applies hard facing materials in at least two layers to prevent overpenetration and the consequent presence of excessive iron from the parent material in the hard facing.

The nose of a steel chain saw blade has a generally circular tip and two relatively straight, slightly diverging edges extending from the tip. The radius of the circular tip is relatively small.

Hard facing is applied to the nose of chain saw blades to promote better wear characteristics inasmuch as it is this area which is subject to considerable heat and wear by the chain as it tracks on the blade, especially during the making of a cut.

For the type of environment the hard faced blade is subjected to, it is desirable not to have the hard facing material too hard for it must be tough enough to withstand impact. Yet the hard facing must have good wear characteristics. Cobalt based hard facing has been found to satisfy the conflicting requirements of wear and toughness.

Heretofore, the application of cobalt based hard facing to the nose of a chain saw blade by an inert gas shielded arc process has caused excessive iron from the parent material to dilute the hard facing and adversely affect its desired characteristics.

There is a present need, therefore, for a method to produce an effective hard facing on an object's wear surface, such as the nose of a chain saw blade, and for an object so hard faced.

SUMMARY OF THE INVENTION

The present invention provides a process for hard facing an object, such as a chain saw blade, preferably by an inert gas shielded arc process, which prevents excessive dilution of the blade's parent material into the hard facing.

The process envisions the application of an initial hard facing layer applied in such a manner that dilution of parent material into it occurs, if at all, to a limited and acceptable extent. The invention also provides an object which has a hard facing which is not detrimentally affected by the presence of an excessive amount of parent material.

In one form, the present invention contemplates a process wherein an initial coating of hard facing is applied to the area of an object to be hard faced in such a manner that a metallurgical bond between the layer of hard facing and the parent metal of the object is formed. The metallurgical bond between the initial layer of hard facing and the object is sometimes referred to as a "sweat" bond and is akin to a brazed bond. The bond is distinguished from a weld bond in that the parent material is not melted. Because the parent material is not melted, dilution of parent material in the hard facing is minimal. A second or more layers of hard facing may then be applied to the initial layer to complete the hard faced object without substantially affecting the metallurgical bond between the initial layer and the parent material.

In more specific form, the present invention envisions the application of a cobalt based hard facing to a steel object in an area which is relatively thin, as is the nose of a chain saw blade. The edges of the object bounding the area to be hard faced are radiused, by an arc torch, milling or other suitable method, to prevent parent iron from entering into the initial and subsequent layers of hard facing. The surface of the area to be hard faced is then cleaned as by a grit blast to roughen it and to remove any oxides. Preferably, a sharp metallic grit is used to avoid the inclusion of silicon in the hard facing and its consequent weakening. The initial layer of cobalt based hard facing is applied to the object, as thus radiused, in particulate form by a flame spray process to obtain a mechanical bond. The applied particles are fused in such a manner that the melting temperature of the parent material is not exceeded and a metallurgical bond between the initial layer and the parent material is formed. The bulk of the hard facing is then applied to the initial layer, preferably by a shielded arc, such as a heliarc, to obtain low porosity in the finished hard facing. The hard faced object is then finished as by grinding.

During the application of the bulk of the hard facing to the first layer, some iron from the parent steel may enter the first layer. Because of this, the particular hard facing material chosen for the initial layer is chosen for its strength compatibility with a small amount of iron. The bulk of the hard facing which will not contain any material amount of iron is chosen for its wear, toughness, and compatibility with the initial layer. Because the composition of the initial and subsequent layers will change with their application, the finished chain saw blade may be viewed as having an initial zone of hard facing and a subsequent zone of hard facing.

The process and object produced by the process of the present invention assures a hard facing which does not have a material amount of parent material. The application of the initial layer of hard facing to the object to obtain a metallurgical bond prevents the parent material from reaching its melting temperature. This prevents dilution of parent material into the hard facing. The subsequent application of the second or more layers of hard facing to the initial layer may dilute the initial layer with a small amount of parent iron; but this dilution does not materially affect the resulting strength of the hard facing because the metallurgical bond between the initial layer and the parent material is not affected.

In short, the initial layer of hard facing provides a barrier between the parent material and the final layers of hard facing. The barrier prevents an excessive amount of parent material from mixing with the hard facing to weaken it.

These and other features, aspects and advantages of the present invention will become more apparent from the following description, appended claims and drawings.

BRIEF DESCRIPTION OF THE FIGURES

FIG. 1 is a plan view of a hard faced chain saw blade;

FIG. 2 is a block diagram depicting the hard face application process of the present invention;

FIG. 3 is an end view of a chain saw blade before the application of hard facing to it and before it has been prepared for receiving hard facing;

FIG. 4 is an end view of a chain saw blade after the edges of the area to be hard faced have been radiused;

FIG. 5 is an end view of a chain saw blade illustrating the application of an initial layer of hard facing material;

FIGS. 6 through 9 schematically depict both the application of the initial hard facing layer and the application of the final hard facing layers; and FIG. 10 illustrates an apparatus suitable for the application of the initial layer of hard facing material.

DESCRIPTION OF THE PREFERRED EMBODIMENTS

FIG. 1 illustrates a steel chain saw blade 10 which has a nose 12 on which successive layers of cobalt based hard facing material 14 have been applied. The chain saw blade has a medial slot or groove indicated by reference numeral 16 for the tracking of the chain portion of the chain saw. The chain continuously circumscribes the blade and has means for effecting a cut in a log or the like.

The chain saw blade is of a high carbon steel having about 0.8 percent carbon and about 1 percent manganese. The particular steel is known as a modified 1074 steel.

The chain saw is used in cutting by bringing nose 12 to bear on a log or the like. This produces a high friction force on the nose. Augmenting this friction force is a relatively sharp radius of the tip of the nose. The wear area of the nose is also relatively small because the blade is relatively thin. Because of these factors, cobalt hard facing 14 is used.

Unfortunately, however, prior art methods of hard facing a chain saw blade by a shielded arc process have not been satisfactory because the resulting hard facing exhibits poor wear characteristics.

It has been found that the application of cobalt based hard facing to the chain saw blade, without producing a condition where iron from the parent material mixes with it to any significant extent, substantially enhances the wear resistance of the ultimate hard facing. More specifically, it has been found that with the presence of more than about 5 percent iron in the cobalt based hard facing material, the material's wear properties are drastically compromised.

The application of an initial layer of hard facing material to the nose of a chain saw blade with a metallurgical or sweat bond constitutes a hard facing layer which acts as a barrier against iron from the blade entering the hard facing material to any significant extent.

With reference to FIGS. 3, 4 and 5, a more detailed description of the application of the initial layer of hard facing material to nose 12 of chain saw blade 10 will be presented.

In FIG. 3, chain saw blade 10 initially has its nose with sharp edges 18 between a surface 20 to be hard faced and sides 22 and 24 of the blade. These sharp edges result from the method of fabrication of the chain saw blade.

The initial step in the process is to round these sharp edges to obtain a radiused surface 26, as is illustrated in FIG. 4. This is preferably done by removing material from the nose by an arc because it is fast, but milling or other suitable methods are adequate. The arc is applied on the edges.

The elimination of the sharp edges overcomes a condition where iron from the nose can enter the hard facing because of the melting of the edges during the application of subsequent layers by an arc. Radiusing the edges also results in a uniform thickness of the initial layer of hard facing material. A uniform thickness avoids thin areas where iron can enter the hard facing material during the application of the subsequent layer to the initial layer, that is, a uniform thickness prevents the loss of the barrier property of the initial layer.

The surface of the parent material is then prepared for receiving the initial layer of hard facing. This is done by cleaning the surface, preferably with a sharp metallic grit blast. This roughens the surface and cleans away any oxides which may have formed.

In FIG. 5, an initial layer 28 of hard facing has been applied. Application of this initial layer is preferably done by flame spraying a powder composition of a cobalt based hard facing material onto the zone of the nose to be hard faced. During the flame spraying, the powder bonds to surface 28 with a mechanical bond.

A flame spraying may be done by the apparatus illustrated in FIG. 10. In the FIG. 10 apparatus, a jig 30 mounts several prepared blades 10. The jig is carried on a shaft 32 of a DC motor 34. This motor is mounted on a table 36 which is capable of reciprocating movement parallel to the axis of the blades by virtue of a screw drive 38 driven by DC motor 40. Motor 34 functions to rotate the blades back and forth through an arc of a circle corresponding to the arc of the end of the noses of the blades. A flame sprayer 42 is mounted on a bracket 44. This bracket is mounted on a shaft 46 for reciprocating movement along a line normal to the axis of the blades being flame sprayed. A crank drive 48 from a DC motor 50 reciprocates the flame sprayer back and forth across the noses of the blades to apply the initial layer of hard facing. During the application of the initial layer, the blades are rotated with respect to the flame sprayer in jig 30, to present their rounded nose. The length of the sides of the nose is presented to the flame sprayer by movement of table 36, and the entire bundle of blades in jig 30 is sprayed because of movement of flame sprayer 42 across them.

Flame sprayer 42 may be of any of a number of well known sprayers such as a Model D-3 Sprayweld gun manufactured by Wall-Colmonoy Corp., Detroit, Michigan. The flame sprayer aspirates powder or particulate hard facing material into a gas stream. The aspirated powder is heated by the burning of an oxidizer, such as oxygen, and a fuel, such as hydrogen or acetylene. The heated powder is transported in a gas stream to the nose of the blade where the mechanical bond between it and the nose occurs.

The spray applied initial layer is then fused with a gas torch or by induction to obtain a metallurgical bond between the initial layer and the nose of the chain saw blade.

The application of the final layer of hard facing is illustrated in FIGS. 6 through 9. In these Figures a blade is mounted in a machine for motion quite similar to the motion described with reference to FIG. 10. Thus, a traverse is made to the left in FIG. 6 of the blade for the purpose of applying hard facing on initial layer 28 with an arc welder 51. The blade is then rotated for the purpose of applying hard facing on the initial area around the rounded tip of the blade. This latter hard facing step is shown in FIG. 7. The blade is then once again traversed to the left for the purpose of applying a hard facing to the balance of the initial layer. FIG. 9 illustrates the blade as it would appear just prior to the completion of the application of hard facing material to the nose. The developing hard facing on initial layer 28 is indicated by reference numeral 52.

It has been found that an initial hard facing of a powdered material marketed as Wallex 50 manufactured by Wall-Colmonoy Corp., of Detroit, Michigan, provides a very satisfactory initial layer. The analysis of this material is shown in the table below:

TABLE I

| Constituent | Percentage of Total Composition |
| --- | --- |
| C | 0.75 |
| Cr | 25.00 |
| Ni | 11.00 |
| B | 3.00 |
| Si | 2.75 |
| Fe | 1.00 (maximum) |
| W | 10.00 |
| Co | Balance |

The nickel, boron and silicon in the composition of Table I increases the fluidity of the composition during its application. Thus the amount of heat required to apply and fuse the material can be relatively low to avoid melting parent material and getting it into the hard faced material.

The alloy exhibits good toughness to withstand shock and a relatively high wear hardness to resist wear.

The final layer or layers of hard facing material is preferably a modification of an alloy having the ASTM specification A-399-56T (RCoCR-A). This specification is to an alloy in rod form with constituents shown in the following table:

TABLE II

| Constituent | ASTM Specification (Percentage of Total Alloy) | ASTM Specification As Modified (Typical) |
| --- | --- | --- |
| C | 0.90 to 1.40 | 1.30 |
| Mn | 0.10 (maximum) | <0.10 |
| Si | 0.40 to 2.00 | 1.20 |
| Cr | 26.00 to 32.00 | 28.50 |
| Ni | to 3.00 | 0.75 |
| Mo | to 1.00 | <0.05 |
| W | 3.00 to 6.00 | 4.45 |
| Fe | 3.00 | <1.00 |
| Co | Balance | Balance |

It should be noted that the preferred alloy composition has less than 1 percent iron. This is because some iron reaches the hard facing material during the application of the hard facing from the chain saw blade proper. As such, the amount of iron in the alloy before application is held to a low percentage to admit to an increased amount of iron in the alloy as applied.

As was previously mentioned, the final hard facing is preferably applied by inert gas arc welding. With an arc application, the initial layer and the final layers are welded together to form an essentially homogeneous hard facing except for composition gradients. The metallurgical nature of the bond between the initial layer and the parent material of the chain saw blade is not materially altered by the application of the subsequent layer. As such, the iron content in the hard facing does not exceed 5 percent.

Because of the composition gradient through the initial layer and the subsequent layer of hard facing, the completed hard faced chain saw blade may be viewed as having an initial zone of hard facing on which a subsequent zone of hard facing has been applied.

After the application of the final hard facing, the hard facing is ground to conform its sides to the sides of the saw blade and its periphery to the desired periphery of the nose. Slot 16 is then ground into the blade and the hard facing material.

What is claimed is:

1. An improved chain saw blade of the type having a pair of substantially planar, closely spaced sides, and a hard faced nose, the improvement comprising:
    a. an initial zone of hard facing metallurgically bonded with a sweat bond to the nose around the periphery thereof, the bond being effected without melting the nose; and
    b. at least one additional zone of hard facing bonded to the initial layer.

2. The improved chain saw blade claimed in claim 1 wherein:
    a. the initial and subsequent zones of hard facing are cobalt based;
    b. the chain saw blade is steel and
    c. the additional zone is bonded to the initial layer with a weld bond.

3. The improved chain saw blade claimed in claim 2 wherein:
    the steel edges bounding the hard facing are rounded.

4. The improved chain saw blade claimed in claim 3 wherein the initial zone of hard facing contains no more than about 5 percent iron.

5. The improved chain saw blade claimed in claim 4 wherein at least a portion of the initial zone constituents includes:
    a. about 0.75 percent carbon;
    b. about 25 percent chromium;
    c. about 11 percent nickel;
    d. about 3 percent boron;
    e. about 2.75 percent silicon;
    f. a maximum of 5 percent iron;
    g. about 10 percent tungsten; and
    h. a balance of cobalt.

6. The improved chain saw blade claimed in claim 5 wherein at least a portion of the additional zone constituents include:
    a. from about 0.9 to about 1.4 percent carbon;
    b. a maximum of 0.1 percent manganese;
    c. between about 0.4 to about 2 percent silicon;
    d. from about 26 to about 32 percent chromium;
    e. up to 3 percent nickel;
    f. up to 1 percent molybdenum;
    g. from about 3 to about 6 percent tungsten;
    h. no more than 3 percent iron; and
    i. a balance of cobalt.

7. The composition claimed in claim 6 wherein the constituents of the additional zone are present in the following amounts:
    a. about 1.3 percent carbon;
    b. about 1.2 percent silicon;
    c. about 28.5 percent chromium;
    d. about 0.75 percent nickel;
    e. less than 0.05 percent molybdenum; and
    f. about 4.45 percent tungsten.

* * * * *

O-1050
5/69)

UNITED STATES PATENT OFFICE
CERTIFICATE OF CORRECTION

Patent No. 3,744,363      Dated  July 10, 1973

Inventor(s)  Salvador Espana and Brunson Bert Font

It is certified that error appears in the above-identified patent and that said Letters Patent are hereby corrected as shown below:

In the specification: Column 5, line 17, "0.75" is misaligned; line 34, "(RCoCR-A)" should be --(RCoCr-A)--.

In the claims: Claim 1, column 6, line 19, insert --; and (c) the iron in the zones of hard facing being less than about five per cent.--.  Claim 4, column 6, delete lines 30 through 32 in their entirety.  Claim 5, column 6, line 33, "5" should be --4-- and "4" should be --3--. Claim 6, column 6, line 44, "6" should be --5-- and "5" should be --4--.  Claim 7, column 6, line 57, "7" should be --6-- and "6" should be --5--.

Signed and sealed this 27th day of August 1974.

(SEAL)
Attest:

McCOY M. GIBSON, JR.
Attesting Officer

C. MARSHALL DANN
Commissioner of Patents